United States Patent Office 3,148,907
Patented Sept. 15, 1964

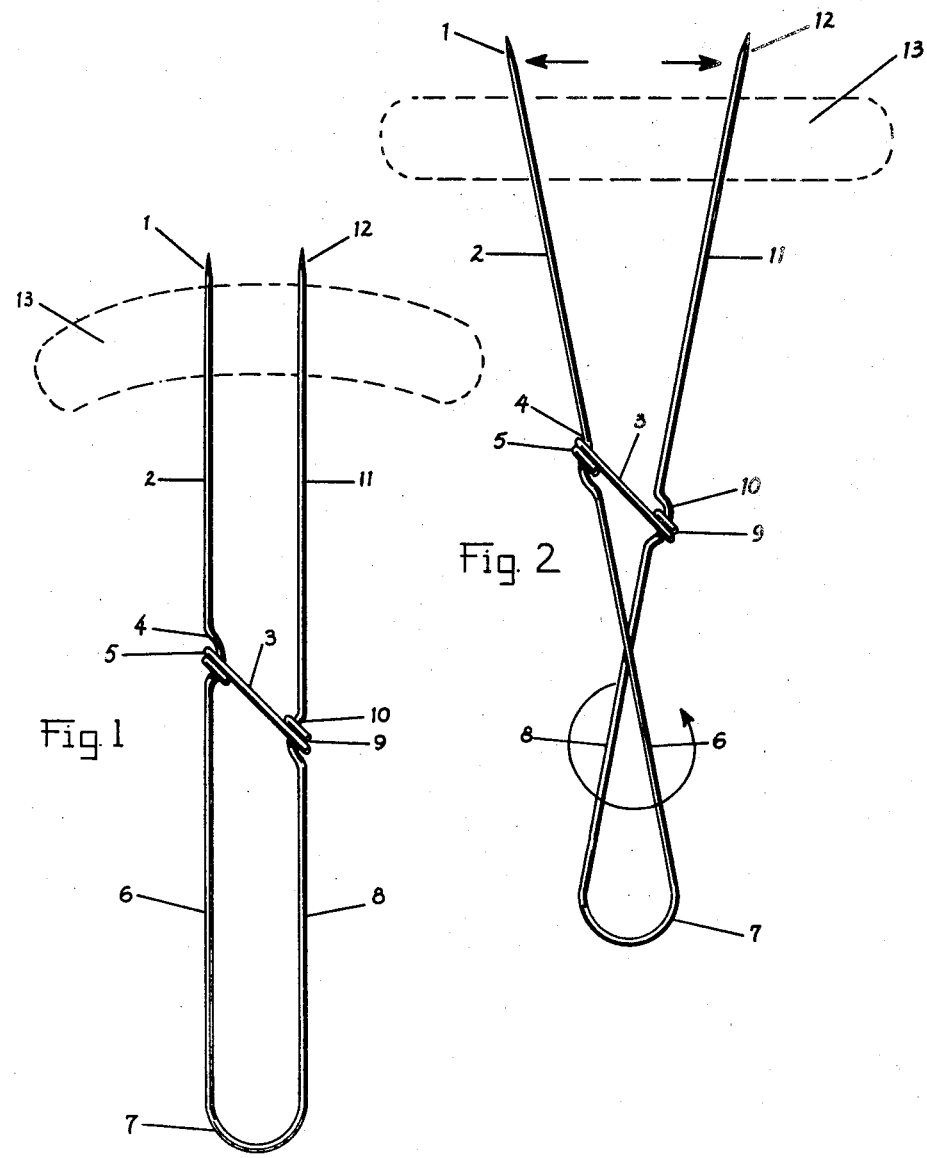

3,148,907
HOT DOG BARBECUE FORK
Dana Peterson, % New Products, P.O. Box 2141,
San Diego, Calif.
Filed July 1, 1963, Ser. No. 291,747
1 Claim. (Cl. 294—61)

This invention is in combination a locking barbecue fork comprising operatively engaging sections in association with a plurality of work engaging members.

The primary object of my invention is to provide an inexpensive, adjustable locking barbecue fork that may be easily and effectively used.

The common types of barbecue forks in use are more expensive to manufacture, cost more than my invention, and do not operate as easily as my barbecue fork.

Note the simplicity of construction. Together with its objects and advantages my invention will be best understood from a study of the following description taken in connection with the accompanying drawings wherein:

FIGURE 1 is a side elevational view of the hot dog barbecue fork in unlocked position.

FIGURE 2 is a side elevational view of my invention in locked position.

My novel combination of hot dog barbecue fork means consists essentially of two elements, i.e., one wire member including tines and handle and another wire member including locking means. The tines and handle are formed of one member of relatively medium diameter resilient wire and is of generally U-shaped form. Section 6 and the intermediate of bent middle section 7 of the U-shaped member and the adjacent section 8 comprise the handle of my invention. Numerals 2 and 11 are tines and 1 and 12 are the pointed extremities of said tines. Numeral 3 indicates the other element attached at extremities 5 and 9 to points 4 and 10 respectively. Said member 3 functions in a locking manner.

To fasten my barbecue fork to a hot dog my invention is adjusted to the unlocked position shown in FIGURE 1. The tines 2 and 11 are held in one hand and the other hand turns the handle portions 6 and 8 until said tines are parallel. The tine extremities 1 and 12 are then forced into and through the frankfurter 13 and still holding the tines in one hand the other hand turns the handle portion either clockwise or counter-clockwise until the handle portions 6 and 8 assume the position shown in FIGURE 2 wherein tine extremities are farther apart. FIGURE 2 shows my invention in a locked position and the frankfurter is held firmly on tines 2 and 11. Said tines will not tear away from frankfurter 13 as one might surmise. The locking action of my barbecue fork may be shown by the following: numerals 4 and 10 show pivotal points of member 3 at extremities 5 and 9 of said member. The distance of pivotal point 10 from extremity 12 is a greater distance than pivotal point 4 from extremity 1. This pivotal variance enables element 3 in combination with the tines 2 and 11 and handle element 6, 7, and 8 to achieve a means of holding a frankfurter and locking my invention.

To unlock my barbecue fork and release the frankfurter, the handle portion is turned clockwise or counter-clockwise to return the tines to the parallel position shown in FIGURE 1.

It is understood that minor variation from the form of the invention disclosed herein may be made without departure from the spirit and scope of the invention, and that the specification and drawings are to be considered as merely illustrative rather than limiting.

What I claim is:

A member of generally U-shaped form including a handle portion and a pair of resilient parallel tines with pointed extremities, each tine having a recessed loop therein at unlike distances from the tine extremity of the other tine, said recessed loop formed to receive the extremity of another member positioned transverse of and to said tines having means to affix loosely in said recessed loops of said tines, said transverse member being non-perpendicular to either tine whereby said tines may move apart and lock when the handle portion is turned clockwise or counter-clockwise, and whereby said tines may be unlocked and move together when the handle portion is turned vice versa.

References Cited in the file of this patent
UNITED STATES PATENTS

| | | |
|---|---|---|
| 2,110,640 | Aldrich | Mar. 8, 1938 |
| 2,999,452 | Hardy | Sept. 12, 1961 |